United States Patent
Tsui et al.

(10) Patent No.: US 6,195,328 B1
(45) Date of Patent: Feb. 27, 2001

(54) BLOCK ADJUSTMENT OF SYNCHRONIZING SIGNAL FOR PHASE-CODED SIGNAL TRACKING

(75) Inventors: James B. Y. Tsui, Dayton; Dennis M. Akos, Athen, both of OH (US); Michael H. Stockmaster, Cedar Rapids, IA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/061,354

(22) Filed: Apr. 15, 1998

(51) Int. Cl.$^7$ ..................................................... G01R 31/08
(52) U.S. Cl. .......................... 370/210; 375/354; 375/361; 370/517
(58) Field of Search ..................................... 370/503, 515, 370/517; 375/354, 361, 367; 455/132

(56) References Cited

U.S. PATENT DOCUMENTS

| | | |
|---|---|---|
| 4,613,977 | 9/1986 | Wong et al. . |
| 4,785,463 * | 11/1988 | Janc et al. ................................ 375/1 |
| 4,928,106 | 5/1990 | Ashjaee . |
| 5,223,843 * | 6/1993 | Hutchinson .......................... 342/352 |
| 5,347,284 | 9/1994 | Volpi et al. . |
| 5,347,546 | 9/1994 | Abadi et al. . |
| 5,459,473 | 10/1995 | Dempster et al. . |
| 5,546,381 | 8/1996 | Fukushima . |

OTHER PUBLICATIONS

Parkinson, B.W., Spilker, J.J., "Global positioning system: theory and applications," vol. 1 and 2, American Institute of Aeronautics and Astronautics, Inc., 1996.

Kuo, B.C., "Automatic control systems," 6$^{th}$ Edition, Prentice–Hall, Englewood Cliffs, NJ, 1991.

\* cited by examiner

Primary Examiner—Michael Horabik
Assistant Examiner—Anthony A. Asongwed
(74) Attorney, Agent, or Firm—Gerald B. Hollnis; Thomas L. Kundert

(57) ABSTRACT

An improved acquisition and tracking system for Global Positioning System (GPS) signals. The system relies on block adjustment of the synchronizing signal of the bi-phase shift keying (BPSK) signal in order to obtain correct carrier frequency and phase angle. This improved system has the advantages of being more robust in the presence of noise than conventional approaches and also of lending itself to simplified implementation since synchronization of the Coarse/Acquisition (C/A) code need only be within half of a chip in order to maintain lock.

4 Claims, 10 Drawing Sheets

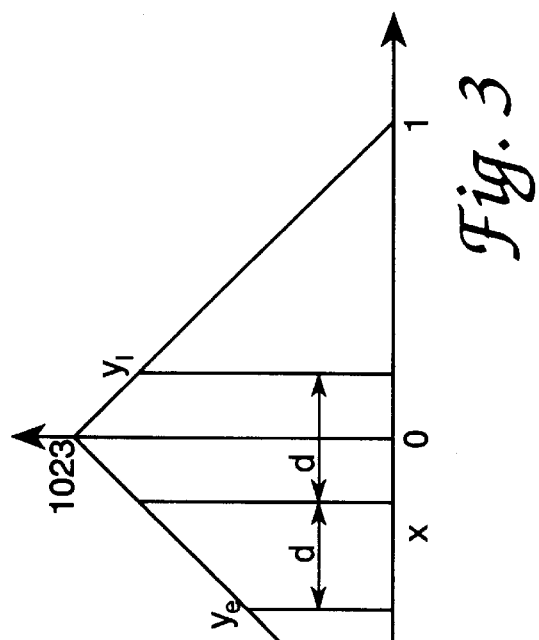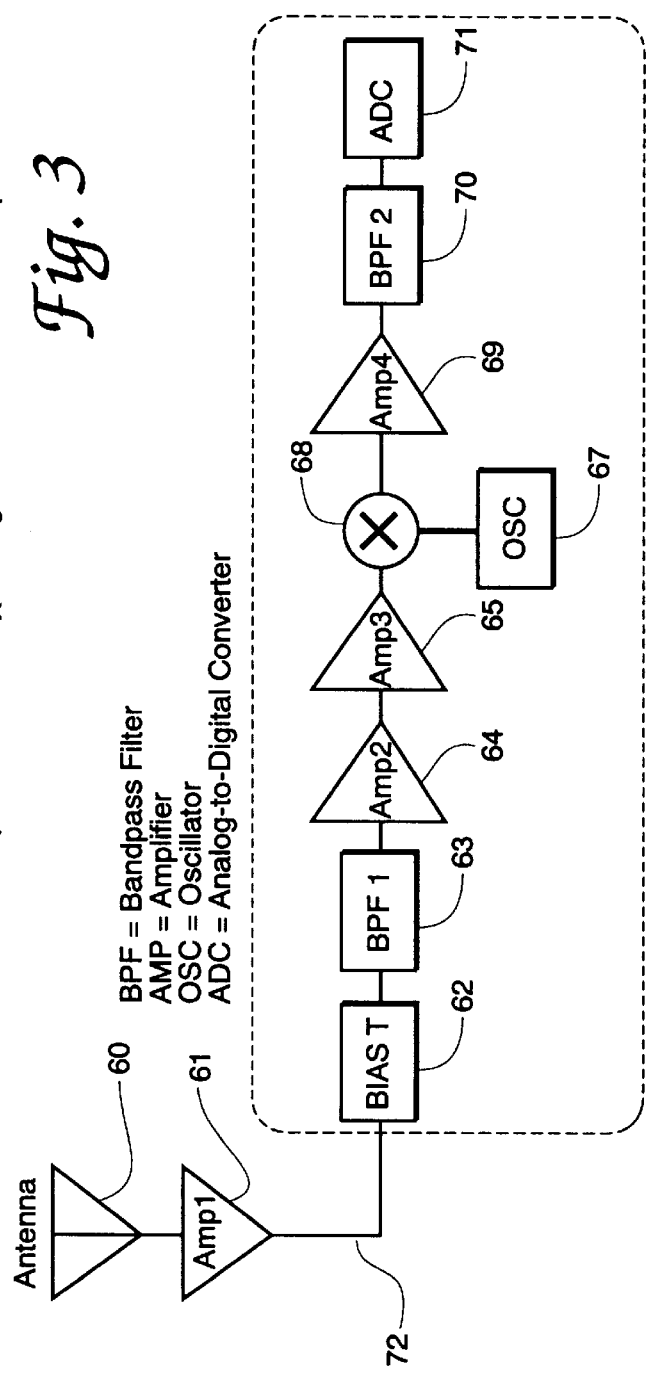

BLOCK ADJUSTMENT OF SYNCHRONIZING SIGNAL FOR PHASE-CODED SIGNAL TRACKING

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates generally to the field of signal tracking by determining the carrier frequency and phase angle of a bi-phase shift keying signal when the spread spectrum code is known. This is especially applicable to acquiring Global Positioning System (GPS) signals whose carrier frequency can be doppler shifted by relative velocity of satellites to the receiver and phase shifted by propagation distance.

2. Description of the Prior Art

In the conventional method of tracking a Global Positioning System (GPS) signal, a full-time acquisition process must be used first to determine the initial condition of the signal tracking loop. This acquisition process is to determine the satellite number, the carrier frequency, and the phase angle of the coarse/acquisition (C/A) code. Close synchronization of the input signal with the locally generated codes and signals to demodulate, or "de-spread", the signal is required for these systems.

The Global Positioning System (GPS) is part of a satellite-based navigation system developed by the United States Defense Department under its NAVSTAR satellite program. A fully operational GPS includes up to 24 satellites approximately uniformly dispersed around six circular orbits having four satellites each, the orbits being inclined at an angle of 55 degrees relative to the equator and being separated from each other by multiples of 60 degrees of longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift keying (BPSK) modulated by two pseudo-random noise (PRN) codes in phase quadrature, designated as the C/A code and P-code. The L2 signal from each satellite is BPSK-modulated by only the P-code. The nature of these PRN codes is described below. One motivation for use of the two carrier signals L1 and L2 is to allow partial compensation for propagation delay of such a signal through the ionosphere, which delay varies approximately as the inverse square of signal frequency f (delay varies as $1/f^2$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 $f_0$=10.23 MHz. A second PRN code for each GPS satellite, sometimes referred to as a coarse/acquisition code or C/A code, is intended to facilitate rapid satellite signal acquisition and hand-over to the P-code and is a relatively short, coarser-grained code having a clock or chip rate of $f_0$=1.023 MHz. The C/A code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, The NAVSTAR Global Positioning System, Van Nostrand Reinhold, New York, 1992, pp. 1–90, incorporated by reference herein.

The fundamental concepts of GPS reception is disclosed Wong et al. in U.S. Pat. No. 4,613,977. The C/A code has a chip rate of 1.023 Mhz and a length of 1023 chips, thus, the code repeats itself every millisecond. The code is chosen to be a pseudo-random spread spectrum modulation. The carrier frequency of the GPS signal is at 1575.42 Mhz. The C/A code and the carrier are synchronized. The carrier is bi-phase coded by the C/A code. The navigation data of the GPS C/A code is 50 Hz, which means there may be a phase shift every 20 ms due to the navigation code. If there is no phase shift, the phase shift between two consecutive milliseconds of data is a constant. If there is a navigation data bit change, the phase change between the two consecutive milliseconds of data will differ from the linear changing phase angle with a discontinuity of 180 degrees.

The conventional approach to processing a GPS signal is through two control loops: a code loop (or an early-late delay-lock loop) and a carrier loop (or a radio frequency (RF) phase-locked loop). This apparatus is shown by Hutchinson in U.S. Pat. No. 5,223,843. The two loops must operate together to de-spread the signal, track the carrier frequency and detect the phase shift in the GPS satellite signal. The employed apparatus is often referred to as the signal tracking loop. A simplified block diagram of a conventional approach is shown in FIG. 1. In this figure, the digitized signal passes a first mixer 10 to strip the carrier frequency, since the other input to the mixer 10 is an estimate of the carrier signal from the carrier loop. The output from the first mixer contains only the C/A code and the navigation and the navigation data. The second mixer 11 will strip the code, because the other input to this mixer 11 is an estimate of the code from the code loop. Thus, the output from the second mixer is a continuous wave (CW) signal and the navigation data. A narrow band filter can determine the frequency and the phase change of the GPS satellite signal. The two loops operate together in a continuous manner.

The disadvantages of the FIG. 1 conventional acquisition process include its complexity; moreover this implementation is designed such that the internally generated codes and signals must maintain close synchronization in order to allow further processing. In addition to reducing these difficulties te present invention is more robust to input signal level changes.

SUMMARY OF THE INVENTION

The present invention provides a simpler and more robust alternative to the conventional signal acquisition and tracking portion of a Global Positioning System (GPS) receiver. Block synchronization allows the C/A code demodulation to continue tracking even if as much as one-half chip out of phase.

The Global positioning system acquisition and tracking apparatus for block adjustment synchronizing of locally-generated demodulation signals for phase-coded signal tracking block adjustment by said acquisition and tracking system is made up of the following elements:

(a) a global position signal-radio frequency receiver having a frequency downconverted output signal;

(b) a digital signal generating analog to digital converter connected to said frequency downconverted output signal of said radio receiver;

(c) a coarse/acquisition code generating circuit having input from a digital storage means capable of providing spread spectrum demodulation sequence that corresponds of said output signal;

(d) a plurality of coarse signal generators each connected to a signal representing said coarse/acquisition code and to signals representing differing carrier frequencies ranging about a received frequency of said input signal;

(e) a plurality of frequency correlators, each corresponding to one said plurality of coarse signal generators, to generate an element-by-element multiplication of the frequency components of said input signal with the frequency components said respective coarse demodulation signal; and (f) a comparator for locating one of said frequency correlators producing an output with the largest relative magnitude from which coarse synchronization parameters can be calculated;

(g) early coarse/acquisition signal generator means for producing an early coarse/acquisition code signal from said coarse/acquisition code;

(h) an early demodulator for using said early coarse/acquisition code signal on said input signal to produce an early output signal;

(i) a prompt coarse/acquisition code demodulator for using said prompt coarse/acquisition code signal on said input signal to produce a prompt output signal;

(j) a delay coarse/acquisition code signal generator for producing a delay coarse/acquisition code signal;

(k) a delay output signal generating demodulator circuit connected with said coarse/acquisition code signal and said input signal;

(l) a threshold comparator for comparing the relative output strength of said early output signal to said delay output signal so that phase angle synchronization of said coarse/acquisition code signal can be maintained; and (m) a phase angle monitor for detecting a phase angle trend in said prompt output signal from which adjustments in said coarse carrier frequency can be made.

The inventive simplified global positioning system phase coded signal tracking method also includes a process with the following steps:

(1) converting a satellite signal into a nonaliased digitized input signal;

(2) obtaining from a storage means the coarse/acquisition code for said satellite signal;

(3) creating a range of coarse demodulation frequencies whose frequencies range about the expected received frequency of said input signal;

(4) generating a plurality of local signals that are the product respectively of said plurality of coarse demodulation frequencies with said coarse/acquisition code;

(5) producing a plurality of resultant signals from correlating respectively a frequency-domain version of said input signal with a frequency-domain version of said plurality of local signals;

(6) locating element from said plurality of resultant signals with greatest magnitude;

(7) designating a starting point for coarse/acquisition code signal synchronization based on location of said element within respective resultant signal;

(8) designating a coarse carrier frequency corresponding to the coarse demodulation frequency of said respective resultant signal;

(9) calculating an initial carrier phase angle from said element;

(10) devising an early coarse/acquisition code signal by circularly shifting said coarse/acquisition code signal to the left;

(11) devising a delay coarse/acquisition code signal by circularly shifting said coarse/acquisition code signal to the right;

(12) devising an early correlation sum by summing magnitudes of correlation of said early coarse/acquisition code signal with said input signal;

(13) performing a delay correlation sum by summing magnitudes of correlation of said delay coarse/acquisition code signal with said input signal;

(14) shifting said coarse/acquisition code signal as a function of the ratio of said early correlation sum to said delay correlation sum; and

(15) updating said coarse/acquisition code signal with a new carrier frequency based on a trend in phase angle of said prompt output signal.

BRIEF DESCRIPTION OF THE DRAWINGS

FIG. 3 is an illustration of the assumed correlation output.

FIG. 4 is a block diagram of apparatus used for pre-processing the GPS signal to obtain a digital sample.

DETAILED DESCRIPTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

The basic idea to process the GPS satellite signal is through the discrete Fourier transform (DFT). If x(n) is the input data taking out C/A code, the DFT output X(k) can be written as $$X(k) = \sum_{n=1}^{N} x(n) e^{\frac{-j2\pi kn}{N}} \quad (1)$$

where k represents a certain frequency component, x(n) is a certain input data point and N is the total number of points. If x(n) is obtained from digitizing a sinuoidal wave, the highest $|X(k_i)|$, across a certain threshold to exclude a lack of signal case, represents the frequency of the GPS satellite signal. The phase of $X(k_i)$ can be written $$\theta = \frac{Im(X(k_i))}{Re(X(k_i))} \quad (2)$$

where θ represents the initial phase of the sine wave, Im and Re present the imaginary and real components of X(k) respectively. In general all the k components (k=0 to N−1) are required to find the maximum frequency component and the DFT equation will be used N times. The fast Fourier transform (FFT) operation can be used to simplify the calculation. If the frequency of the input signal is known, one only needs to perform the operation in the DFT equation once. The value of $X(k_i)$ can be found from one value of $k_i$.

Figure 9:
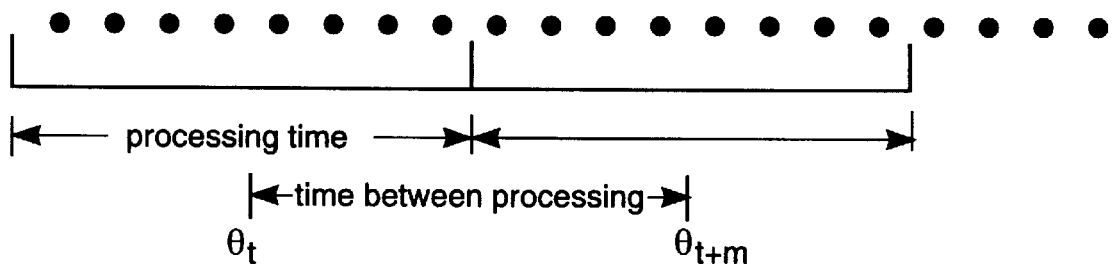
FIG. 9 is an illustration of the data processing approach for determining the fine frequency.
Figure 10:
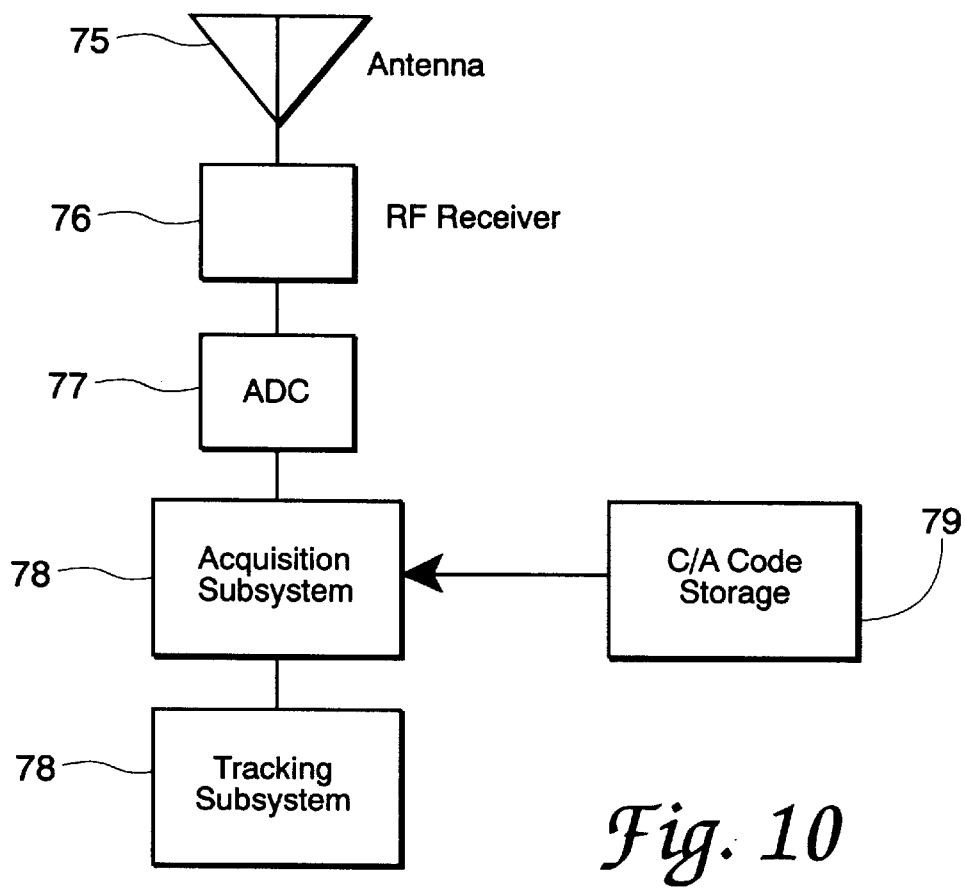
FIG. 10 is an overall hardware block diagram of a GPS receiver according to the invention.

From the phase equation for $X(k_i)$, the fine frequency of the satellite GPS signal carrier can be obtained. Using FIG. 9 to illustrate the point, the phases obtained at two times t and t+m are $\theta_t$ and $\theta_{t+m}$ respectively. The fine frequency can be obtained as $$f = \frac{\delta\theta}{m} = \frac{\theta_{t+m} - \theta_t}{m} \quad (3)$$

where m is time between two consecutive processing. As long as the angle $\partial\theta$ is less than $2\pi$, the frequency can be uniquely identified.

In a GPS receiver, the acquisition procedure is used to determine whether a certain GPS satellite is presented in the collected data. Once the GPS satellite signal is detected, it is tracked. The acquisition procedure can be divided into three steps: (1) using one millisecond of digitized data to determine the initial C/A code starting point and the coarse carrier frequency; (2) finding the refined coarse carrier frequency and its initial phase angle; and (3) using seven milliseconds of data to find the fine carrier frequency.

During this part of the acquisition procedure, for each satellite, coarse demodulation signals are locally generated from the products of the digitized C/A code and carrier frequencies. The locally-generated coarse demodulation frequencies range from 1245 kHz to 1255 kHz in 500 Hz steps, thus including a total of 21 frequencies. It is anticipated that this frequency range will cover the possible Doppler frequency range, if the receiving antenna is stationary. A wider number of locally-generated coarse demodulation frequencies could be implemented to account for larger doppler shift attributable to the receiving platform moving relative to the satellite. The sample length for each input is chosen to be 5000 points to provide several data points for each chip (1/1.023 MHz. or 978 ns.) in a full repetition of the C/A code modulated within the GPS satellite signal. A circular correlation between each local generated signal and the input data is performed and the output contains 5000 points. The maximum of all the 21 correlation outputs is selected. This maximum value provides the starting point in time of the C/A code in the Input Signal and the selected coarse demodulation frequency with a resolution of 500 Hz from the true GPS satellite Doppler-shifted carrier frequency.

During the second part of the acquisition procedure, the coarse carrier frequency is refined and initial phase angle determined. Since the starting point of the C/A code in the data is known, one millisecond of data beginning at the starting point of the C/A code is selected. Multiplying in time domain the C/A code with the data will strip the C/A code from the data leaving an output sinusoidal wave. The next step is to find the frequency of this sinusoidal wave representing the GPS satellite signal carrier. In this operation, twenty-one refined demodulation frequencies are locally generated and range from −500 Hz to +500 Hz centered around the coarse carrier frequency in 50 Hz steps. The DFT output equation (Equation (1) above) is used to calculate the output frequency. The highest output will be the desired frequency. This operation improves the frequency resolution to 50 Hz. The phase angle equation (Equation (2) above) is used to determine the initial phase angle of the carrier frequency. It appears that if finer carrier frequency resolution is used to start the tracking procedure, better results can be obtained.

The third part of the acquisition procedure is to generate the fine carrier frequency. The approach is to take seven milliseconds of consecutive data beginning with the starting point of the C/A code then to use the refined coarse frequency to find the phase angle of each repetition of the C/A code in the consecutive data. This is followed by taking the difference in the phase angle between two adjacent data sets to obtain six sets of delta phase angle (δθ). The average value of delta phase angles and the fine frequency may then be found from Equation (3). The value determined is usually well within 10 Hz of the actual frequency using the concepts of the invention.

The tracking procedure according to the invention has the prerequisites of finding the starting point of the C/A code in the input data, and finding the fine carrier frequency and its phase angle. The tracking procedure is includes two parts: (1) tracking the carrier frequency; and (2) tracking the C/A code.

(1) The first part of the tracking procedure, tracking the carrier frequency, can be further broken down into three subparts:

• In subpart one, one millisecond of input data, with the starting point at a starting point of a C/A code, is repetitively grabbed.

• In subpart two, a local C/A code signal is generated. The local signal contains two sets of locally-generated data: the C/A code and the carrier signal. For a certain satellite, the respective C/A code is fixed, thus once this code is generated it is used repetitively. The carrier signal must be generated with the correct frequency and the initial phase angle. For each millisecond of data a different carrier signal will be used. The difference between adjacent carriers is the initial phase angle and the frequency. This initial phase angle will be calculated and adjusted every millisecond. The requirement to adjust the initial phase angle is to generate a continuous local carrier signal from millisecond to millisecond. The phase angle difference between this signal and the input data over one millisecond should be either 0 or π radians since this is the way the navigation signal is coded. Ideally, the phase angle of the carrier signal and the C/A code should be synchronized since the satellite modulates its GPS signal with this synchronization. Demodulating without synchronization of the carrier signal and the C/A code suggests that noise is being added during local demodulation. However, for simplicity, in the locally-generated C/A code the phase angle between them is not synchronized because it is not necessary in stripping out the information in the satellite GPS signal.

• In subpart three, the locally-generated carrier frequency is adjusted. The carrier frequency is adjusted in fact every ten milliseconds. This fine frequency is calculated using the fine frequency equation (Equation (3)) for the change between each adjacent millisecond of data. The average from the last ten such calculations is used to adjust the locally-generated carrier frequency. Adjustments must be made due to the circular nature of phase angle so that wrap-arounds beyond 0 and 2π radians are not treated as discontinuities.

(2) The second part of the tracking procedure is to track the C/A code, shifting a whole sample period as necessary and also fine tuning the synchronization by fractions of a chip. A whole sample period is the inverse of the sampling frequency. A "chip" is the basic value of the randomized signal source for a duration of time equal to the reciprocal of the code clock frequency ("chipping rate"). The tracking procedure uses three locally-generated C/A code signals: one early, one prompt, and one delayed. The prompt signal is obtained from the product of the C/A code and the carrier signal. The early signal is the product of the carrier and the C/A code shifted two samples to the left. The delay signal is product of the carrier and the C/A code shifted two samples to the right. The phase angle equation (Equation (2)) is used with these signals to obtain amplitude information. Since only the amplitudes of the early and delay signals are of interest, the initial phase angle of the carrier is not critical. Thus all three locally-generated signals use the same carrier frequency and the same phase angle for generation purposes.

The amplitudes generated by these three locally-generated signals tend to be noisy with the results changing randomly from millisecond to millisecond. Therefore, the average over every ten milliseconds is used to make a decision. The amplitude generated by the prompt signal is used to test whether the GPS satellite signal still exists. The signal could disappear for various reasons, most typically when the GPS satellite moves below the horizon. If the GPS satellite signal drops below a certain amplitude threshold, the tracking processing stops. If the locally-generated signal were in code phase with the received GPS satellite signal, then the early and delay signals would provide an equal amplitude. Typically, the locally-generated signal is not in phase with the input signal. Therefore, a greater amplitude of the early signal with respect to the delay signal would indicate a phase angle lag. A lesser amplitude respectively indicates a phase angle lead. Assessing whether to shift the locally-generated code phase angle is done by creating a ratio of the amplitude of the early signal to the delay signal and comparing them to an upper threshold, indicating the need to reduce the code phase angle. The ratio of the early to the late output is used to make the decision; if this ratio is greater than 1.4 or less than 0.7, the phase of the C/A code needs to be adjusted. These thresholds are used to determine whether the next millisecond of input data should be shifted to the left (for decrease in code phase angle) or to the right (for increase in code phase angle).

The ratio is also used to determine the fine resolution in the fine tuning of the C/A code tracking to a fraction of a chip. This is an approximation approach, because the correlation function of the C/A code of different satellites provides slightly different results. The assumed correlated result is shown in FIG. 3. This assumption is that for fractions of a chip period from this correlation peak the correlation decreases linearly until there is no significant correlation one chip period or more out of phase. An upper and lower threshold for determining whether to shift the signal relative to the demodulating C/A code is based on a ratio of the correlation outputs of the early and late signals which can be represented as $y_e$ and $y_l$. This is an approximation approach, because the correlation function of different satellites provides slightly different results. For a 1023 code length, the peak of the correlation is 1023. And one chip away the correlation peak is assumed to be 0. If we assume that x<0 and $r_y = y_e/y_l$ over the period of the moving average, the distance x can be obtained as $$x = \frac{-(1-d)(1-r_y)}{(1+r_y)} \text{ for } x+d > 0 \qquad (4)$$

$$x = \frac{(1-r_y) - d(1+r_y)}{(r_y - 1)} \text{ for } x+d < 0 \qquad (5)$$

where d is the distance between the prompt and early/late versions. These equations are used to determine the fine time resolution.

Figure 1:
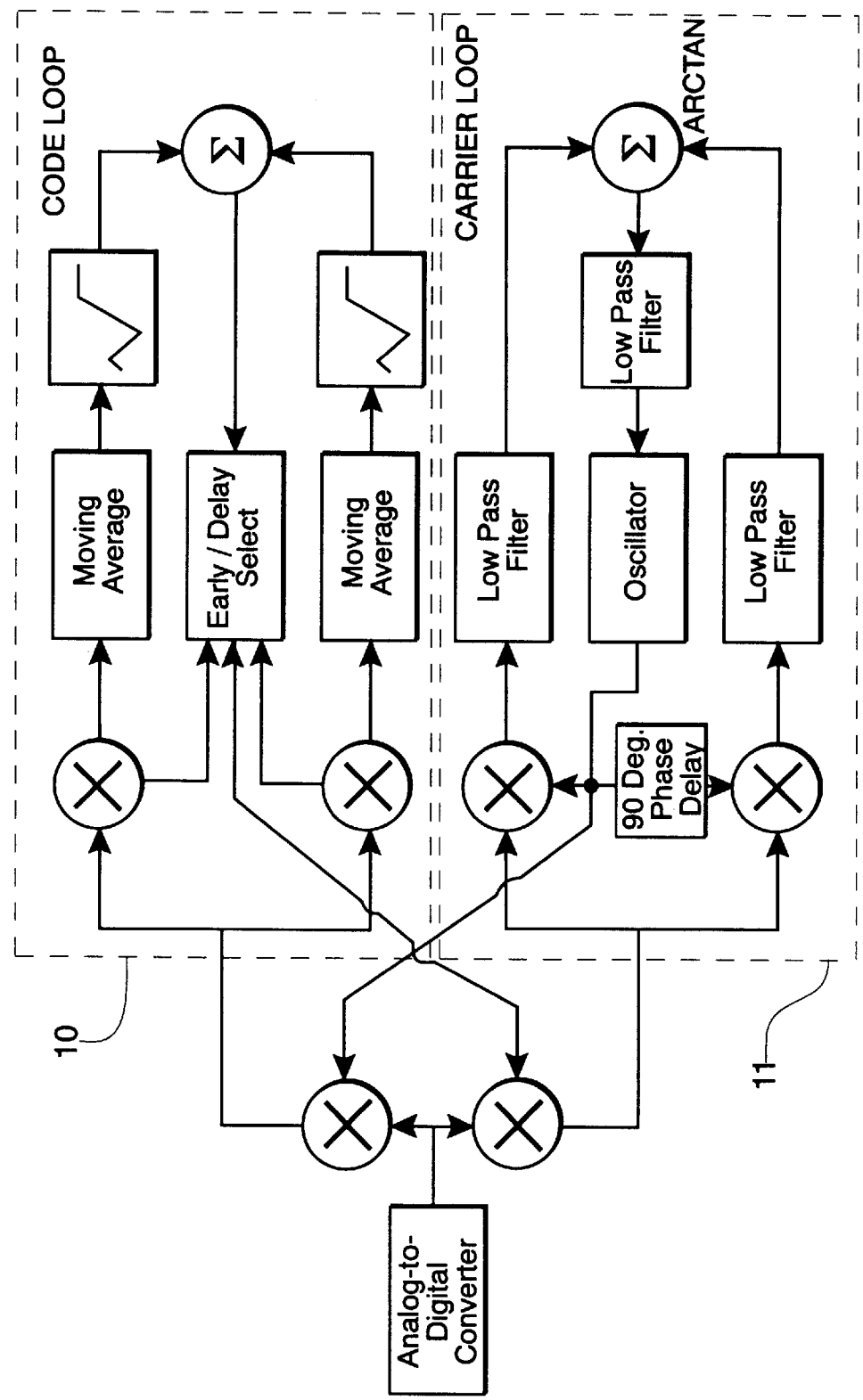
FIG. 1 is a block diagram of a prior art conventional signal tracking loop.
Figure 2:
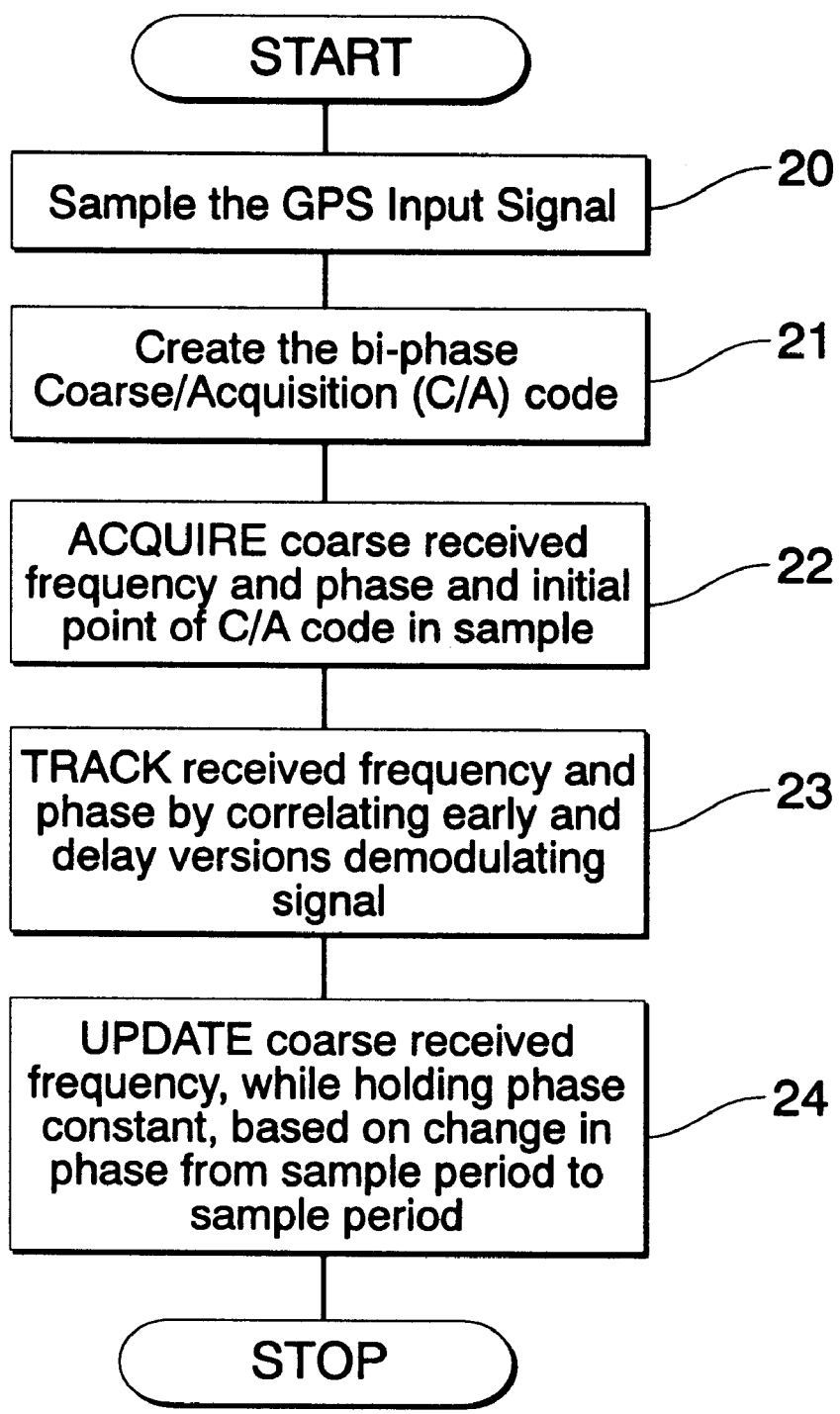
FIG. 2 is a top-level flow diagram of an acquisition method according to the invention.

The preferred embodiment of the Block Adjustment of Synchronizing Signal (BASS) includes the processing steps as shown in FIG. 2. The first step 20 is to take digital samples of the input signal at a 5 MHz sample frequency. The second step 21 creates the bi-phase coarse/acquisition (C/A) code for each satellite signal of interest. Then acquisition 22, track 23 and update 24 functions are used.

FIG. 4 shows the experimental apparatus to collect data for use in implementing the invention. The antenna 60 is integrated with a first amplifier 61 of 25 dB of gain. A long cable 72 about 20 ft is used to carry the input signal to the remaining apparatus. The bias tee 62 is used to provide the 5 $V_{DC}$ power to the first amplifier 61 associated with the antenna 60. Bandpass filter 1 63 with a bandwidth of 10 MHz is used to limit the band signals. Amplifiers 2 (64) and 3 (65) provide 60 dB of gain. The local oscillator 67 operates at 1554.17 Mhz. For an input signal at 1575.42 MHz, the center of L1 frequency, the output from the mixer 68 is at 21.25 MHz. Amplifier 4 (69) has 30 dB of gain and bandpass filter 2 (70) has a bandwidth of 2 MHz. The analog-to-digital converter (ADC) 71 has 8 bits and operates at 5 MHz.

With this arrangement, the unambiguous bandwidth from the ADC 71 is 2.5 MHz and the center of the band is at 1.25 MHz. The ADC will put the downconverted signal at the center of its processing band. This can be determined by dividing 21.25 MHz by 2.5 MHz and finding the remainder which is 1.25 MHz, the center of the processing band. With this digitizing speed, one millisecond of data contain 5000 points of data and is a complete C/A code. Sampling below the Nyquist rate of twice the highest frequency component results in aliasing the input signal to the baseband.

Figure 5:
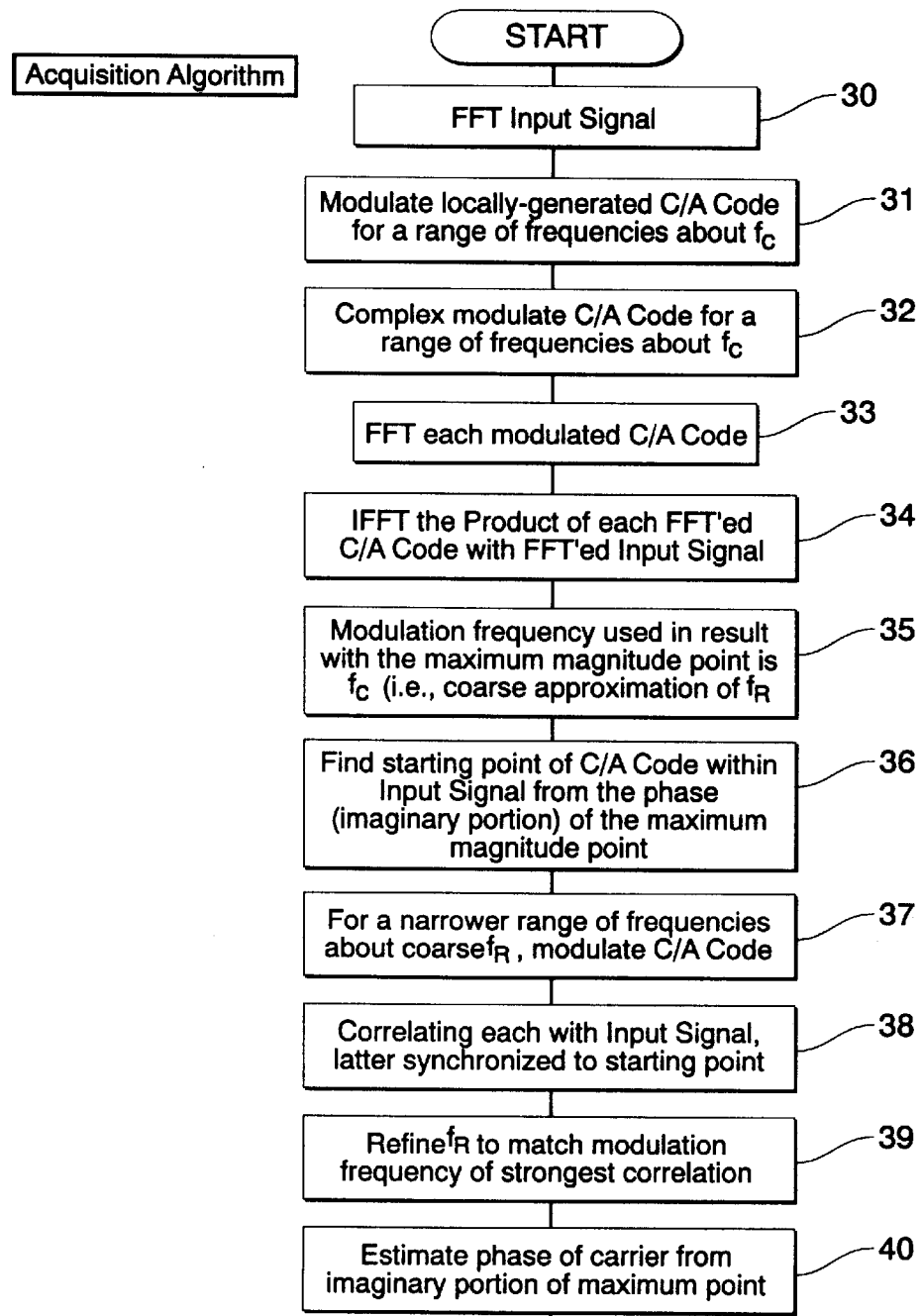
FIG. 5 is the acquisition portion of an acquisition and tracking method according to the invention.

The AQUISITION function 22, introduced in FIG. 2, is shown in flow diagram form in FIG. 5. For a range of frequencies about the expected received frequency, a complex sinusoid modulated this C/A code is used as reference. The input signal and the reference signal can be correlated through frequency-domain transformation to obtain final results in the time domain. The greatest magnitude found in the time domain and above a certain threshold designates the coarse received frequency and C/A code starting point in the input signal. Then obtain fine frequency by synchronizing demodulating of the input signal with a narrower range of receive frequency modulated locally-generated C/A code.

Figure 6:
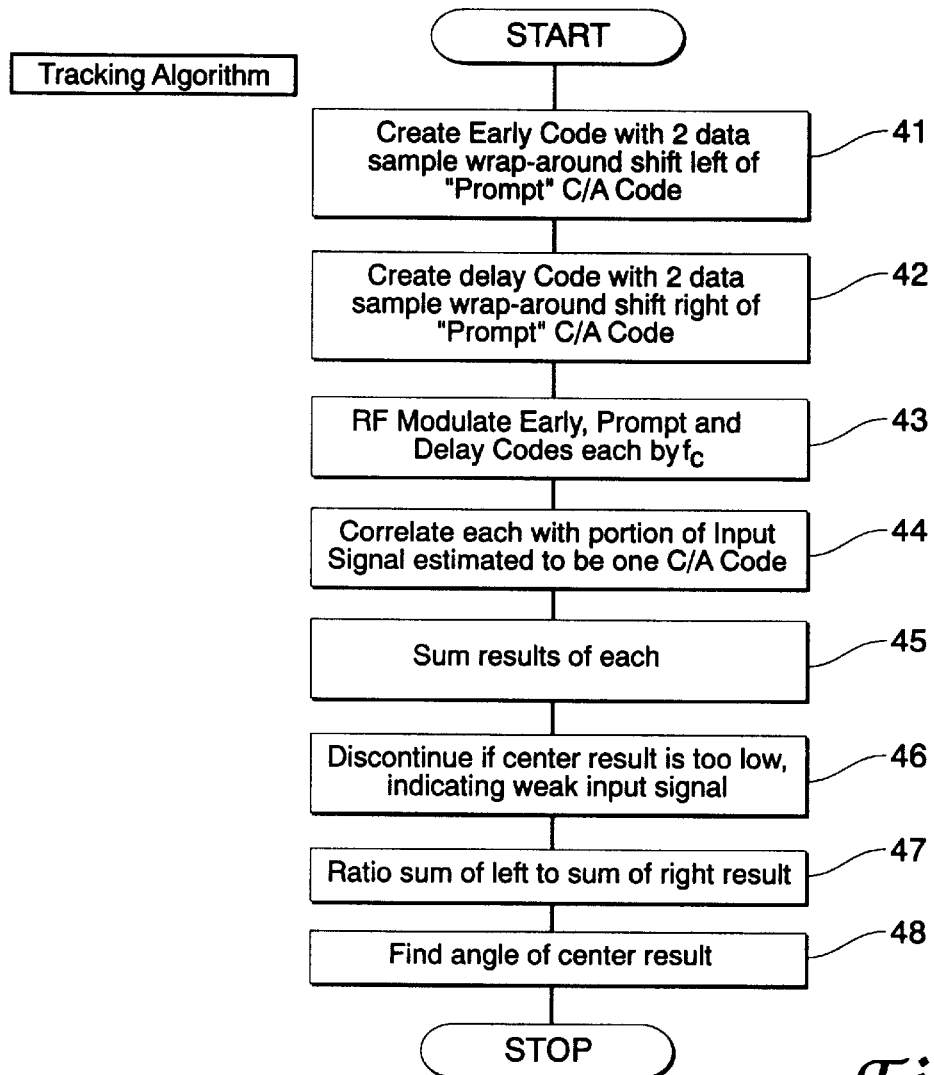
FIG. 6 the tracking portion of an acquisition and tracking method according to the invention.

The TRACK function 23, introduced in FIG. 2, is shown in flow diagram form in FIG. 6. We use early, prompt and delay versions of the received frequency modulated locally-generated C/A code to demodulate the input signal, comparing ratios of the early and delay results to determine whether left or right shift of the locally-generated C/A code is needed to maintain synchronization.

Figure 7:
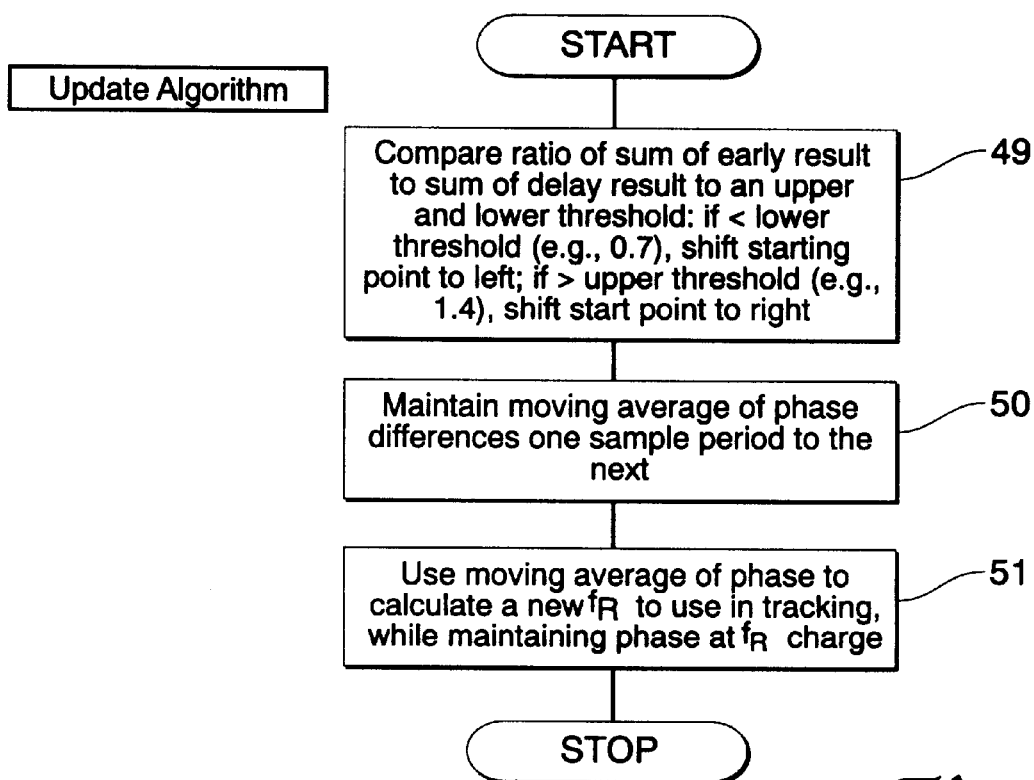
FIG. 7 is the update portion of an acquisition and tracking method according to the invention.
Figure 8:
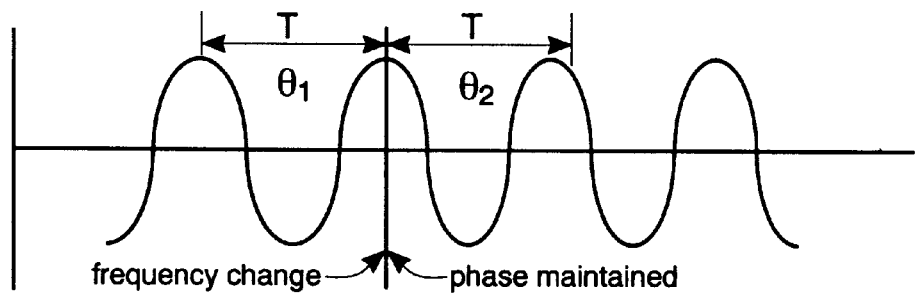
FIG. 8 is a depiction of how the update portion maintains phase when updating locally-generated received frequency.

The UPDATE function 24, introduced in FIG. 2, is shown in flow diagram form in FIG. 7. Based on an average of the calculated received frequencys, we update the center frequency used for the prompt C/A code and other calculations. When center frequency is updated, maintain the C/A code phase angle to avoid misalignment as shown in FIG. 8. Note that the update thresholds are 0.7 and 1.4.

Figure 11:
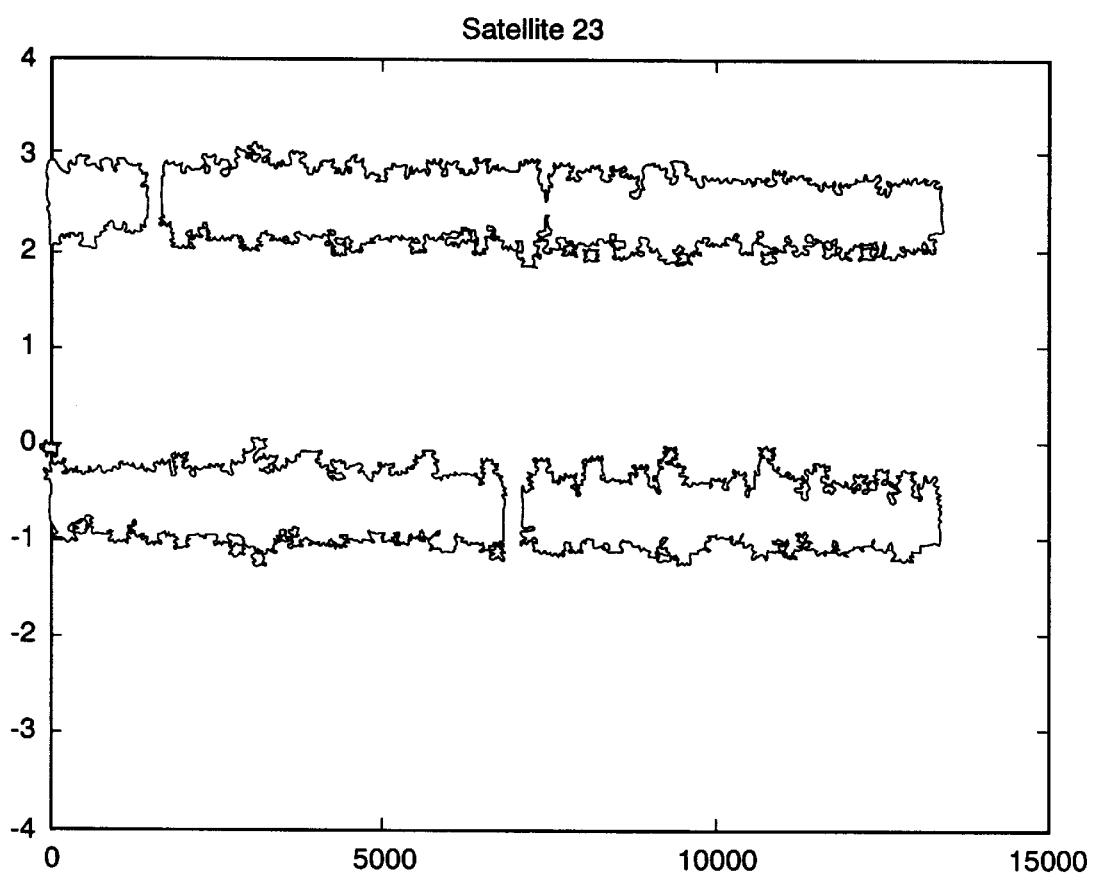
FIG. 11 is a first example test results from using the setup shown in FIG. 4.
Figure 12:
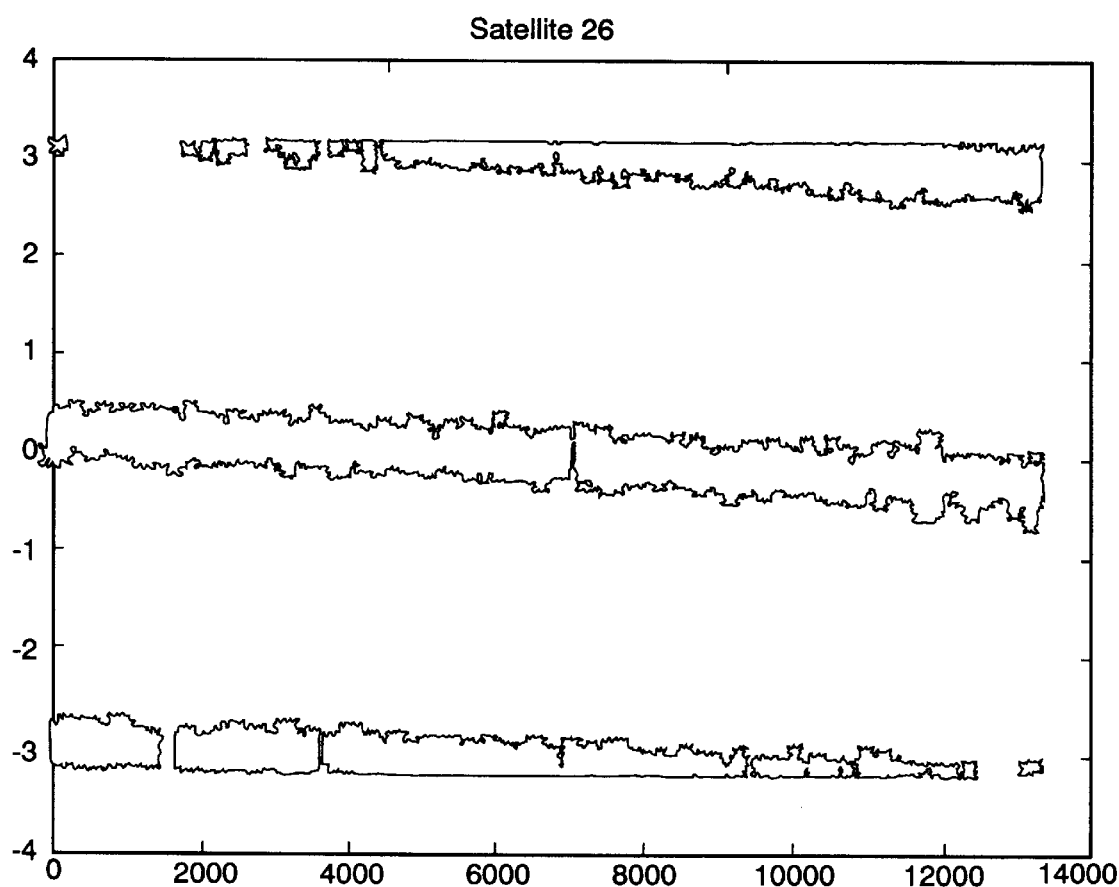
FIG. 12 is a second example test results from using the setup shown in FIG. 4.

The test apparatus of FIG. 4 was tested on GPS satellite signals. In FIG. 11, the test apparatus yielded one example in which the outputs are grouped into two rows and they are separated by approximately π radians. In FIG. 12, the test apparatus yielded a second example in which the outputs are grouped in three groups of π, 0, -π radians. In navigation data decoding, the π and -π data are grouped together. Only data with π radians change are of interest.

The results shown in FIGS. 11 and 12 have an output with a negative slope. It is anticipated that the slope is the steady state frequency error. A first order control circuit is used to model it. The steady state frequency error for a ramp input function is $$e_{ss} = \frac{R}{K_V} \approx \frac{R n_u \Delta t}{2\pi} \quad (6)$$

where R is the initial frequency error, $K_v$ is the loop gain, $n_u$ is the number of C/A codes (10) between updates and Δt is the C/A code period ($10^{-3}$ second). Therefore, the gain is about 628 (2π×100) for the loop described. From the slope of the curve, the steady state error can be calculated as follows:

$$e_{ss} = \frac{0.4}{2\pi \times 13} \approx 0.005 \text{ Hz} \quad (7)$$

where 0.4 is the difference in radius obtained from the slope and the data length is 13 seconds. Using this result, the R value in Equation (6) is close to 3 Hz which is close to the update value generated in invention. Increasing the $n_u$ to 20, the slope doubled to 0.8. Decreasing the $n_u$ to 5, the slope is 0.2. It appears that constant slope is caused by the steady state error.

Figure 13:
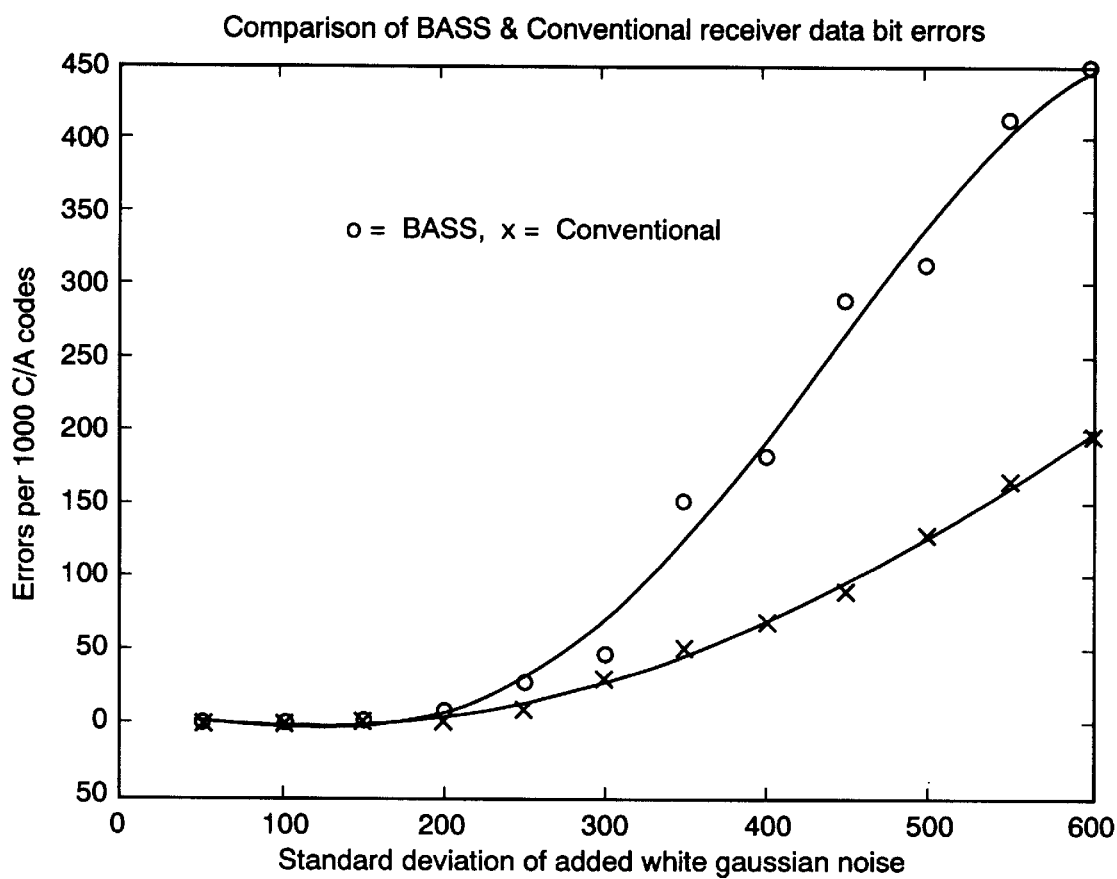
FIG. 13 is a robustness comparison between the prior art conventional tracking algorithm approach and the invention when exposed to white gaussian noise.

Because the invention is not as sensitive as the conventional tracking algorithm, it is difficult to generate a new data set with low signal-to-noise ratio to test the tracking algorithms. To avoid this problem, noise is added to existing data set and used to compare outputs. Since the original data was collected from actual GPS satellite signals, the signal-to-noise ratio is not known. The only known quantity is the amount of noise added. One second of data with added noise was processed. The number of errors in the navigation data was plotted in FIG. 13. The conventional tracking algorithm is less sensitive to noise. The reason for the difference can be attributed to the wider bandwidth of the invention.

In the drawings and specification, there has been set forth a preferred embodiment of the invention, and, although specific terms are employed, the terms are used in a generic and descriptive sense only and not for purposes of limitation, the scope of the invention being set forth in the following claims.

What is claimed is:

1. Global positioning system acquisition and tracking apparatus for block adjustment synchronizing of locally-generated demodulation signals for phase-coded signal tracking block adjustment by said acquisition and tracking system comprising:

a global position signal-radio frequency receiver having a frequency downconverted output signal;

a digital signal generating analog to digital converter connected to said frequency downconverted output signal of said radio receiver;

a coarse/acquisition code generating circuit having input from a digital storage means capable of providing spread spectrum demodulation sequence that corresponds of said output signal;

a plurality of coarse signal generators each connected to a signal representing said coarse/acquisition code and to signals representing differing carrier frequencies ranging about a received frequency of said input signal;

a plurality of frequency correlators, each corresponding to one said plurality of coarse signal generators, to generate an element-by-element multiplication of the frequency components of said input signal with the frequency components said respective coarse demodulation signal; and a comparator for locating one of said frequency correlators producing an output with the largest relative magnitude from which coarse synchronization parameters can be calculated;

early coarse/acquisition signal generator means for producing an early coarse/acquisition code signal from said coarse/acquisition code;

an early demodulator for using said early coarse/acquisition code signal on said input signal to produce an early output signal;

a prompt coarse/acquisition code demodulator for using said prompt coarse/acquisition code signal on said input signal to produce a prompt output signal;

a delay coarse/acquisition code signal generator for producing a delay coarse/acquisition code signal;

a delay ouput signal generating demodulator circuit connected with said coarse/acquisition code signal and said input signal;

a threshold comparator for comparing the relative output strength of said early output signal to said delay output signal so that phase angle synchronization of said coarse/acquisition code signal can be maintained; and a phase angle monitor for detecting a phase angle trend in said prompt output signal from which adjustments in said coarse carrier frequency can be made;

said Global Positioning System acqusition and tracking apparatus maintaining synchronization with said input signal so that additional information such as navigation signals encoded as a phase angle shift.

2. A simplified global positioning system phase coded signal tracking method comprising steps of:

converting a satellite signal into a nonaliased digitized input signal;

obtaining from a storage means the coarse/acquisition code for said satellite signal;

creating a range of coarse demodulation frequencies whose frequencies range about the expected received frequency of said input signal;

generating a plurality of local signals that are the product respectively of said plurality of coarse demodulation frequencies with said coarse/acquisition code;

producing a plurality of resultant signals from correlating respectively a frequency-domain version of said input signal with a frequency-domain version of said plurality of local signals;

locating element from said plurality of resultant signals with greatest magnitude;

designating a starting point for coarse/acquisition code signal synchronization based on location of said element within respective resultant signal;

designating a coarse carrier frequency corresponding to the coarse demodulation frequency of said respective resultant signal;

calculating an initial carrier phase angle from said element;

devising an early coarse/acquisition code signal by circularly shifting said coarse/acquisition code signal to the left;

devising a delay coarse/acquisition code signal by circularly shifting said coarse/acquisition code signal to the right;

devising an early correlation sum by summing magnitudes of correlation of said early coarse/acquisition code signal with said input signal;

performing a delay correlation sum by summing magnitudes of correlation of said delay coarse/acquisition code signal with said input signal;

shifting said coarse/acquisition code signal as a function of the ratio of said early correlation sum to said delay correlation sum; and updating said coarse/acquisition code signal with a new carrier frequency based on a trend in phase angle of said prompt output signal.

3. The Global Positioning System acquisition and tracking apparatus of claim 1 in which said plurality of frequency correlators further comprises means for performing fast Fourier transform (FFT) to obtain said frequency components.

4. The acquisition and tracking method of claim 2 in which said step of producing a plurality of resultant signals includes determining said frequency-domain version by means of a fast Fourier transform (FFT).

* * * * *